Patented May 31, 1927.

1,630,699

UNITED STATES PATENT OFFICE.

CARL E. FROSTMAN, OF SEATTLE, WASHINGTON.

FURNITURE CLEANING AND POLISHING COMPOSITION.

No Drawing.   Application filed November 28, 1925.   Serial No. 72,047.

This invention relates to compositions for cleaning and polishing furniture.

The general object of this invention is to provide a composition of this character which will remove ink stains, remove paint on polished furniture, which need not be rubbed, and which will dry immediately.

A further object is to provide a furniture cleaning and polishing composition which will not stick after using and which will not soil the most delicate fabrics applied to the furniture after the polishing composition has been applied thereto.

My composition consists of the following ingredients in substantially the following proportions:—

Boiled linseed oil, one-half pint; turpentine, one-half pint; kerosene, one-half pint; vinegar, one-half pint; white of one egg.

In mixing this composition, the turpentine is added to the linseed oil and then kerosene is added to the turpentine and linseed oil, and then the vinegar is added. To this is added the white of the egg, and all of the ingredients are then thoroughly mixed. The composition is to be shaken well before using.

One of the principal advantages of this composition is, in the first place, that it cleans the furniture as, for instance, removing ink stains therefrom or removing paint from polished furniture as well as polishes the same, and furthermore that it need not be rubbed but dries immediately, and that articles placed upon the table or other surface so treated will not stick thereto. Furthermore, this composition will not soil even the most delicate fabric after the composition has been applied to the article and has dried. After the composition is applied, it is polished by the use of a soft cloth.

The white of the egg coacts with the boiled linseed oil and with the turpentine to form a coat for the surface to which the furniture polisher and cleaner is applied. The white of the egg causes the surface of the article to be polished, whereas without the white of the egg the surface will be flat. The white of the egg makes it unnecessary to rub the furniture, as this gives the gloss to the furniture without rubbing.

The turpentine causes the mixture to dry at once and the white of the egg leaves a surface on the object which is not sticky. The combination of turpentine, kerosene and vinegar coacts to remove ink stains and the turpentine acts to remove paint from the polished furniture. The white of the egg is the particular ingredient and without the egg the surface on which the ingredients are applied would be sticky and flat and rubbing would be necessary to obtain any polish at all.

This mixture is particularly desirable for use in polishing automobile bodies. While I do not wish to be limited to the exact amounts of the ingredients referred to in the specification, I have found that a greater amount of white of egg than designated in the mixture will be liable to cause the surface to be sticky or gummy.

I claim:—

A furniture cleaning and polishing composition consisting of the following ingredients in substantially the following proportions:—

Linseed oil, one-half pint; turpentine, one-half pint; kerosene, one-half pint; vinegar, one-half pint; white of one egg.

In testimony whereof I hereunto affix my signature.

CARL E. FROSTMAN.